United States Patent Office 3,637,549
Patented Jan. 25, 1972

3,637,549
POLYOL/LACTAM/SYNTHETIC RESIN MODIFIED UREA-FORMALDEHYDE RESINS
Michael Edgar Hall, Warrington, and Malcolm Negus, Prescot, near Liverpool, England, assignors to Fibreglass Limited, Liverpool, England
No Drawing. Filed Sept. 2, 1969, Ser. No. 854,725
Claims priority, application Great Britain, Sept. 12, 1968, 43,430/68
Int. Cl. C08g 9/10, 9/24, 9/32
U.S. Cl. 260—17.3
8 Claims

ABSTRACT OF THE DISCLOSURE

A urea-formaldehyde resin for use in bonding glass fibres comprises 1 mole of urea together with from 3 to 5 moles of formaldehyde copolymerised with 0.05 mole of a polyol and from 10 to 50% of a lactam based on the amount of urea present.

BACKGROUND OF THE INVENTION

(1) Field of the invention

The present invention relates to plastics resins and in particular to urea-formaldehyde resins suitable for use as binders for glass fibres in glass/resin compositions.

(2) Description of the prior art

The use of phenol-formaldehyde resins as binders for glass fibres has long been known. Such resins suffer from the disadvantage that the forming and curing stages of the glass/resin compositions give rise to effluent problems in the form of toxic fumes. Moreover, such resins do not always possess satisfactory anti-punking properties, "punking" being the exothermic reaction sometimes known to occur in bonded glass fibre insulations when used at high temperatures e.g. of the order of 500° F. resulting in the burning of the resin and breakdown of the insulation.

It is an object of the present invention to provide a urea-formaldehyde resin to replace the phenol-formaldehyde resins employed hitherto which urea-formaldehyde resin does not give rise to effluent problems during forming and curing and provides an improved binder for glass fibres in terms of its anti-punking properties up to temperatures of the order of 1000° F.

SUMMARY

A urea-formaldehyde resin according to the present invention can be expressed in terms of 1 mole of urea which is added to a solution containing formaldehyde. This solution comprises from 3 to 5 moles of formaldehyde copolymerised with 0.05 mole of a polyol and from 10% to 50% of a lactam based on the amount of urea present.

The mixture was heated, acidified after cooling, and its pH was further adjusted if necessary.

DESCRIPTION OF THE PREFERRED EMBODIMENTS

A preferred resin in accordance with the present invention comprises 1 mole of urea together with 4 moles of formaldehyde copolymerised with 0.05 mole of sucrose and 25% of caprolactam or vinyl pyrrolidone based on the weight of urea present.

It is found that with resins of the type according to the invention no precipitation occurs from the monomethylol urea compounds.

The basic resins can be modified by the inclusion of certain other types of plastics resins. These additional resins are a water-soluble epoxide resin, a water soluble melamine-formaldehyde resin or a water soluble styrene-maleic acid copolymer. These additional resins may be added singly or in admixture of two or more to the urea-formaldehyde prepolymer. The addition of these modifier resins to the urea-formaldehyde prepolymer is found to improve hydrolytic stability and odour of the final resinous composition.

A suitable water-soluble epoxide resin modifier is water soluble and contains free epoxide groups, for example a modifier prepared by the reaction of the diglycidyl ether of diphenylol propane with diethanolamine.

A suitable water soluble melamine resin is the water soluble condensate of melamine and formaldehyde prepared by reacting 1 mole of melamine with at least 6 moles of formaldehyde. A suitable commercial resin is that sold by British Resin Products Limited under the name Epok W9801 (registered trade mark).

A suitable water-soluble styrene-maleic acid copolymer is made by first copolymerising styrene with maleic acid anhydride in a benzene solution using a peroxide initiator. The solid polymer is then hydrolysed by dissolving in hot ammonia to produce the required copolymer.

The additional modifier resins may be blended in any required proportions with the basic urea-formaldehyde prepolymer. Thus suitable compositions may contain up to 30% of an epoxide resin modifier or up to 75% of a melamine formaldehyde resin modifier optionally containing up to 75% of an epoxide resin or up to 50% of a styrene-maleic acid copolymer.

The modified or unmodified resin according to the present invention may be used in any conventional manner for the production of bonded glass fibre insulation products. Such products having a fibre density of 3 lbs./cu. ft. and with a binder content of about 10%, when tested for anti-punking properties showed no punking at temperatures up to 1000° F.

The preparation of particular urea-formaldehyde-resins is described in the following examples:

EXAMPLE 1

To 541 gms. formaldehyde was added triethanolamine to bring the solution to pH 8 to 9. 100 gms. urea was then added.

The solution was then heated for an hour at 70° C. Thereafter it was cooled and acidified with $H_2SO_4$ to pH 6 to 7. 28.4 gms. sucrose and 25 gms. caprolactam were then added and heating continued for a further 3 hours at 70° C. The resin was then cooled and 0.880 ammonia added till the pH reached 8.0.

EXAMPLE 2

To 541 gms. formaldehyde was added triethanolamine to bring the solution to pH 8 to 9. 100 gms. urea was then added. The solution was heated for half an hour at 70° C. and was then cooled and acidified with $H_2SO_4$ to pH 6 to 7. 28.4 gms. sucrose and 25 gms. vinyl pyrrolidone were then added and the heating continued for 3 hours at 70° C. The resin was cooled and 0.880 ammonia added till the pH reached 8.0. In place of sucrose, there may be employed pentaerithritol, glucose, sorbitol or manitol.

The various blends of the modifiers with the basic urea-formaldehyde resin were evaluated initially by the Shell mould technique. The stability of the glass/resin bond was assessed by ageing the samples at 50° C. and 100% relative humidity for 16 hours. The results of these Shell mould tests together with the various blends of modifier and basic resin are given in the following table:

| Percent urea based binder | Percent type modifier | Strength (p.s.i.) Non-weathered | Weathered |
|---|---|---|---|
| 100 parts resin | 0 | 460 | 318 |
| | 10 parts epoxide resin | 606 | 251 |
| | 20 parts epoxide resin | 598 | 311 |
| | 33.3 parts M/F resin (+13.3 parts epoxide resin) | 612 | 416 |
| | 33.3 parts M/F resin (+26.6 parts epoxide resin) | 607 | 545 |
| | 100 parts M/F resin (+20 parts epoxide resin) | 480 | 340 |
| | 300 parts M/F resin (+80 parts epoxide resin) | 466 | 220 |
| | 100 parts M/F resin (+20 parts styrene maleic acid) | 376 | |
| | 100 parts M/F resin (+40 parts styrene maleic acid) | 475 | |

The water-soluble epoxide resin used in the above tests was prepared as follows:

The diglycidyl ether of diphenylol propane (185.5 gms.) was dissolved in diacetone alcohol (92.7 gms.) and diethanolamine (105 gms.) added. The mixture was stirred at 100° C. for one hour and then cooled to room temperature. The solution was adjusted to pH 5-6 by the addition of glacial acetic acid (110 ml.).

Similarly, the styrene-maleic acid copolymer used in the above tests was prepared as follows:

Maleic anhydride (24.5 gms.) and styrene (26 gms.) were dissolved in benzene (400 ml.). The mixture was stirred under nitrogen and benzoyl peroxide (0.5 gm.) added. The mixture was then heated under reflux for 4 hours and the solid precipitate filtered. The filter cake was dissolved with heating in dilute ammonia solution.

We claim:
1. A urea-formaldehyde resin consisting essentially of 1 mole of urea together with 3 to 5 moles of formaldehyde copolymerized with 0.05 mole of a polyol selected from the group consisting of pentaerithritol, glucose, sorbitol, manitol and sucrose, and from 10% to 50%, based on the amount of urea present, of a lactam selected from the group consistnig of caprolactam and vinyl pyrrolidone blended with a plastic resin selected from the group consisting of water soluble epoixde resins containing a plurality of 1,2-epoxide groups, water soluble melamine formaldehyde resins, water soluble styrene-maleic acid copolymers, and mixtures thereof.

2. A urea-formaldehyde resin as claimed in claim 1, wherein the water soluble epoxide resin containing a plurality of 1,2-epoxide groups is prepared by the reaction of the diglycidyl ether of diphenylol propane with diethanolamine.

3. An urea-formaldehyde resin as claimed in claim 1, wherein the water-soluble melamine formaldehyde resin is prepared by reacting 1 mole of melamine with at least 6 moles of formaldehyde.

4. An urea-formaldehyde resin as claimed in claim 1, wherein the water-soluble styrene-maleic acid copolymer is prepared by copolymerisation of styrene with maleic acid anhydride followed by hydrolysis of the product with ammonia.

5. A urea-formaldehyde resin as claimed in claim 1, containing up to 30% by weight of said blend of an epoxide resin containing a plurality of 1,2-epoxide groups.

6. An urea-formaldehyde resin as claimed in claim 1, containing up to 75% by weight of said blend of a melamine formaldehyde resin.

7. A urea-formaldehyde resin as claimed in claim 6, containing up to 75% by weight of the melamine formaldehyde resin of an epoxide resin containing a plurality of 1,2-epoxide groups.

8. An urea-formaldehyde resin as claimed in claim 6, containing up to 50% by weight of the melamine formaldehyde resin of a styrene-maleic acid copolymer.

References Cited

UNITED STATES PATENTS

| 2,514,505 | 7/1950 | Morton | 260—70 |
| 3,426,096 | 2/1969 | Anderson | 260—849 |
| 3,479,247 | 11/1969 | Bonzagni | 260—17.3 |

FOREIGN PATENTS

| 584,690 | 10/1959 | Canada | 260—856 |
| 514,058 | 10/1939 | Great Britain | 260—70 |

WILLIAM H. SHORT, Primary Examiner

E. WOODBERRY, Assistant Examiner

U.S. Cl. X.R.

260—39 R, 70 R, 70 M, 834, 849, 855, 856